United States Patent
Lyles et al.

(10) Patent No.: US 10,198,044 B2
(45) Date of Patent: Feb. 5, 2019

(54) FLEXIBLE INFORMATION HANDLING SYSTEM DISPLAY USER INTERFACE CONFIGURATION AND PROVISIONING

(71) Applicant: Dell Products L.P., Round Rock, TX (US)

(72) Inventors: Justin C. Lyles, Austin, TX (US); Jung-Hwan Hong, Austin, TX (US); Yulin Wang, Cedar Park, TX (US); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/411,270

(22) Filed: Jan. 20, 2017

(65) Prior Publication Data

US 2018/0210515 A1 Jul. 26, 2018

(51) Int. Cl.
*G06F 3/02* (2006.01)
*G09G 5/00* (2006.01)
*G06F 1/16* (2006.01)
*H04N 7/14* (2006.01)

(52) U.S. Cl.
CPC .......... *G06F 1/1694* (2013.01); *G06F 1/1616* (2013.01); *G06F 1/1641* (2013.01); *G06F 1/1652* (2013.01); *G06F 1/1656* (2013.01); *G06F 1/1673* (2013.01); *G06F 1/1681* (2013.01); *H04N 7/142* (2013.01)

(58) Field of Classification Search
None
See application file for complete search history.

(56) References Cited

U.S. PATENT DOCUMENTS

| | | | |
|---|---|---|---|
| 7,472,215 B1 | 12/2008 | Mok | |
| 9,823,631 B1 | 11/2017 | Loo | |
| 2004/0190239 A1 | 9/2004 | Weng | |
| 2006/0256090 A1 | 11/2006 | Huppu | |
| 2007/0250568 A1* | 10/2007 | Dunn | H04L 12/1813 709/204 |
| 2008/0082934 A1* | 4/2008 | Kocienda | G06F 3/04883 715/773 |

(Continued)

FOREIGN PATENT DOCUMENTS

| | | | | |
|---|---|---|---|---|
| EP | 2214087 A1 * | 8/2010 | | G06F 3/04886 |
| WO | WO 2005057842 | 6/2005 | | |

OTHER PUBLICATIONS

Dictionary.com definition of antenna, www.dictionary.com/browse/antenna, downloaded Apr. 3, 2018, 4 pages.

(Continued)

*Primary Examiner* — Abdul-Samad A Adediran
*Assistant Examiner* — Kirk W Hermann
(74) *Attorney, Agent, or Firm* — Zagorin Cave LLP; Robert W. Holland (57) ABSTRACT

A portable information handling system with rotationally coupled housing portions having an OLED film display disposed over the housing portions automatically adapts presentation of visual images at the display to the housing portion relative positions and orientation. For example, based on a fold orientation of the housing and a landscape or portrait orientation, visual information adapts to show different user interfaces and content.

19 Claims, 7 Drawing Sheets

(56) References Cited

U.S. PATENT DOCUMENTS

| | | |
|---|---|---|
| 2009/0201639 A1 | 8/2009 | Wang |
| 2010/0064244 A1* | 3/2010 | Kilpatrick, II ........ G06F 1/1616 715/773 |
| 2010/0120379 A1 | 5/2010 | Fukagawa |
| 2010/0238620 A1 | 9/2010 | Fish |
| 2011/0047459 A1* | 2/2011 | Van Der Westhuizen ................... G06F 1/1692 715/702 |
| 2011/0216064 A1* | 9/2011 | Dahl ..................... G06F 1/1616 345/428 |
| 2011/0248838 A1 | 10/2011 | Krahenbuhl |
| 2011/0264745 A1* | 10/2011 | Ferlitsch .............. G06Q 10/109 709/205 |
| 2012/0075166 A1 | 3/2012 | Marti |
| 2012/0280924 A1* | 11/2012 | Kummer ............. H04M 1/0235 345/173 |
| 2013/0009907 A1* | 1/2013 | Rosenberg .............. G06F 3/046 345/174 |
| 2013/0063368 A1 | 3/2013 | Geiger |
| 2013/0335364 A1 | 12/2013 | Tseng |
| 2014/0211394 A1 | 7/2014 | Lin |
| 2014/0268555 A1 | 9/2014 | Kurczewski |
| 2014/0306463 A1 | 10/2014 | Ho |
| 2014/0306908 A1* | 10/2014 | Nagaraju .............. G06F 3/0416 345/173 |
| 2015/0227225 A1* | 8/2015 | Park ...................... G06F 1/1641 345/173 |
| 2015/0331593 A1* | 11/2015 | Lee ....................... G06F 1/1677 345/667 |
| 2016/0011738 A1 | 1/2016 | Bang |
| 2016/0062395 A1* | 3/2016 | Liu ....................... G06F 1/1618 345/1.3 |
| 2016/0187994 A1 | 6/2016 | La |
| 2016/0321969 A1* | 11/2016 | Kambhatla ............ G09G 3/003 |
| 2017/0044810 A1 | 2/2017 | McBroom |
| 2017/0357289 A1* | 12/2017 | Ahn .................... H04M 1/0268 |
| 2018/0054905 A1 | 2/2018 | Maatta |

OTHER PUBLICATIONS

Dictionary.com definition of aligned, www.dictionary.com/browse/aligned, downloaded Apr. 3, 2018, 5 pages.

Dictionary.com definition of alignment, www.dictionary.com/browse/alignment, downloaded Apr. 3, 2018, 4 pages.

U.S. Appl. No. 15/411,258, filed Jan. 20, 2017, entitled "Flexible Information Handling Sytsem and Display Configuration Management" by inventors Yulin Wang et al.

U.S. Appl. No. 15/411,292, filed Jan. 20, 2017, entitled "Flexible Information Handling System Display User Interface Peripheral Keyboard Configuration" by inventors Deeder Aurongzeb et al.

* cited by examiner

FLEXIBLE INFORMATION HANDLING SYSTEM DISPLAY USER INTERFACE CONFIGURATION AND PROVISIONING

CROSS REFERENCE TO RELATED APPLICATION

U.S. patent application Ser. No. 15/411,258, entitled "Flexible Information Handling System and Display Configuration Management" by inventors Yulin Wang, Jung-Hwan Hong, Justin C. Lyles, and Deeder M. Aurongzeb, filed on Jan. 20, 2017, describes exemplary methods and systems and is incorporated by reference in its entirety.

U.S. patent application Ser. No. 15/411,292, entitled "Flexible Information Handling System Display User Interface Peripheral Keyboard Configuration" by inventors Deeder M. Aurongzeb, Jung-Hwan Hong, Justin C. Lyles, and Yulin Wang, filed on Jan. 20, 2017, describes exemplary methods and systems and is incorporated by reference in its entirety.

BACKGROUND OF THE INVENTION

Field of the Invention

The present invention relates in general to the field of information handling system displays, and more particularly to a flexible information handling system and display configuration management.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems provide end users with mobility to perform processing tasks virtually anywhere. Portable information handling systems integrate a power supply, input/output (I/O) devices, wireless communication devices and a display in a portable housing so that the end user can operate the system without coupling to external resources, such as power and communication cables. As processing capability, memory and wireless communication capability have improved, end users have migrated from stationary desktop information handling systems to portable systems for everyday use. Effectively, a user may take his work office to any convenient location, log into a wireless network and have access to an enterprise desktop, storage and other resources. When operating in an enterprise or home environment, portable information handling systems conveniently dock with peripherals that enhance the user interface, such as peripheral displays that offer larger viewing area and peripheral keyboards.

The transition from stationary to portable information handling systems has taken place in part due to advances in display technology. Flat panel displays offer a thin form factor that adapts well in portable housings. For example, liquid crystal displays (LCDs) are adapted to fit into a lid housing portion that rotationally couples to a main housing portion so that the display is maintained in a viewing position during use. A keyboard integrated in the main housing portion upper surface is exposed by rotating the lid portion upwards so that an end user can input at the keyboard while viewing the display. The lid portion rotates down over the keyboard to protect the system in a portable configuration so that the end user can store the system with a minimal footprint when not in use. LCD technology advanced with the introduction of LED backlights to further minimize the lid portion thickness. With the adoption of touchscreen LCDs, a tablet form factor gained popularity in which the entire information handling system integrated in a single planar housing that accepted inputs by touches at the touchscreen. The tablet form factor is widely used in mobile telephone information handling systems and in tablet information handling systems that have an all-in-one configuration. Some systems detachably couple to a base that includes a keyboard so that an end user can readily select to configure the system as either a tablet, a conventional clamshell system or a convertible system that rotates the keyboard portion 360 degrees to expose the display in a tablet mode.

More recently, organic light emitting diode (OLED) display devices have been introduced that further reduce the thickness of the display structure. OLED devices generate images with pixels that produce light of different colors, as opposed to LCDs that filter light provided by a backlight structure. The OLED structure is thinner since it does not use a backlight, and also flexible so that the OLED material molds to the structure of the housing to which it couples, such as in devices that have curved display edges. One difficulty with integration of OLED devices into a portable information handling system is providing sufficient structure to support the thin OLED film that produces the visual image and protecting the outer surface of the OLED film from damage. Another difficulty is that OLED films generate heat as a byproduct of illumination of images. The thin form factor provided by an OLED display is appreciated by end users who seek highly portable devices, however, portable devices need sufficient robustness to survive in various usage configurations. Further, some structural thickness is typically necessary to integrate various processing components in a housing that supports the OLED display.

SUMMARY OF THE INVENTION

Therefore, a need has arisen for a system and method which provides a flexible information handling system display user interface configuration and provisioning.

In accordance with the present invention, a system and method are provided which substantially reduce the disadvantages and problems associated with previous methods and systems for coordinating housing rotational configuration and display content presentation. An information handling system housing having plural rotationally-coupled housing portions with a foldable display disposed over the housing portions coordinates display presentation and relative rotational orientation of the housing portions to enhance end user interactivity.

More specifically, a portable information handling system has plural processing components disposed in a housing having plural rotationally-coupled portions. Hinges disposed between the rotationally-coupled housing portions selectively adjust friction to cooperatively bias and maintain the housing portions in desired relative rotational orientations. For example, three or four housing portions configure in a planar tablet orientation, a clamshell orientation, a three or four fold videoconference orientation and a closed orientation. A display film disposed over the housing portions, such as an OLED film, folds with the housing portions and automatically adapts content presentation based upon detected housing portion relative orientation. For example, folding housing portions from a planar to a clamshell orientation changes content presentation from all portions of the display to the portions vertically raised in a viewing position and presents other content on horizontally disposed portions, such as a virtual keyboard or virtual touchpad. End user selection of a desired housing portion rotational orientation is enhanced by monitoring end user touches and system context to predict when an end user desires to change housing portion orientation and the desired orientation. Hinge resistance is managed to aid in transition between rotational orientations based upon the predicted end user desired orientation. As the desired orientation is achieved, display content is automatically adapted, such as by changing the display portions used to show content and/or by changing the content in focus.

The present invention provides a number of important technical advantages. One example of an important technical advantage is that a foldable display integrates into an information handling system housing and folds as housing portions are rotated relative to each other. Housings having three, four or more portions are maintained in a relative orientation desired by the end user, such as by maintaining housing hinge resistance during movement of the system as a whole and relaxing hinge resistance to movement when end user inputs indicate a desire to change relative housing portion orientation. Display content adapts to detected orientation by presenting the primary content in an area of the display corresponding to a housing portion viewed by the end user and presenting input/output devices and other user interface information in secondary display portions. For example, primary content presented across an entire display in a tablet orientation is adjusted to present at a vertically-oriented portion in a clamshell mode. As another example, a three or four fold configuration creates a standing system with multiple display views in multiple orientations to conveniently support a video conference or multimedia viewing. In one embodiment, a peripheral keyboard selectively biases to a typing position on a display portion to trigger presentation of content in a clamshell mode with a virtual touchpad presented proximate the keyboard. Additional functionality included in the keyboard may include a heat sink, a wireless network interface card for cellular or WiFi hotspot communication and/or storage, all of which are accessed with a 60 GHz WPAN between the information handling system and keyboard, such as through antenna aligned when the keyboard biases into position.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system having a flexible display film disposed over rotationally-coupled housing portions automatically configures content presentation and housing portion rotation. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
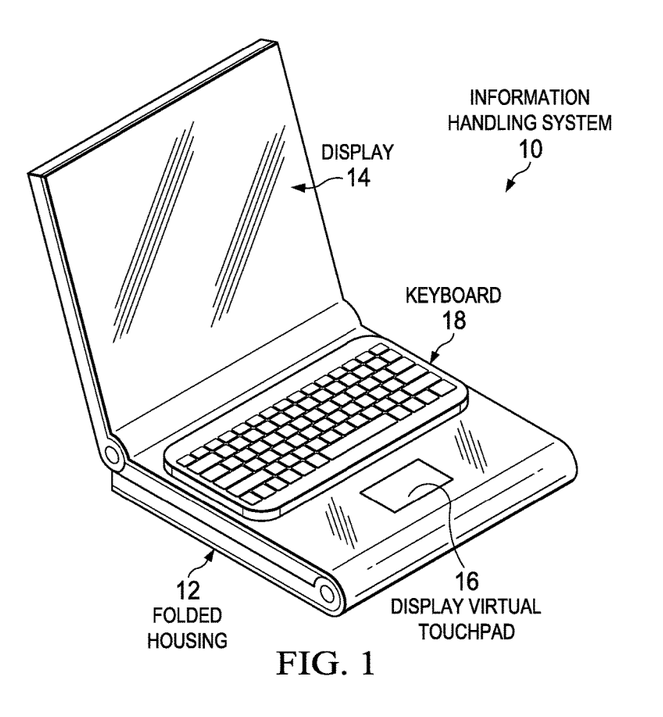
FIG. 1 depicts a side perspective view of a portable information handling system having a foldable display configured in a clamshell orientation.

Referring now to FIG. 1, a side perspective view depicts a portable information handling system 10 having a foldable display 14 configured in a clamshell orientation. The term clamshell configuration refers to the relative rotational orientation of a folded housing 12 to hold display 14 in a viewing position over a keyboard 18 that accepts end user inputs. In the example embodiment, display 14 has a contiguous display film, such as an OLED film, that is disposed over folded housing 12. Display 14 conforms to folded housing 12 and bends as housing portions of folded housing 12 are rotated relative to each other. In the example embodiment, the vertically-oriented portion of display 14 presents content to an end user much as a conventional clamshell portable information handling system, and a peripheral keyboard 18 rests on top of a horizontally-oriented portion of display 14 to accept end user inputs. Information handling system 10 detects the rotational orientation of folded housing 12 portions and, based upon the detected relative orientation, adapts content for presentation at display 14. In the example embodiment, content, such as application output, is presented at the vertically-oriented portion of display 14, a virtual touchpad 16 is presented proximate keyboard 18, and a bottom surface of display 14 folded underneath keyboard 18 has its pixels turned off.

Automated configuration of housing orientation and displayed content enhances an end user experience by adapting interactions to the end user's environment. In various embodiments, folded housing 12 has two, three, four or more portions rotationally-coupled to each other to provide a variety of folded housing configurations. Display 14 interfaces with logic, such as embedded code on a graphics or embedded controller, which uses fold state and vertical orientation of housing portions to select content for presentation at selected portions of display 14. Other operating context may be analyzed as relevant to further define operating modes of information handling system 10. For example, placing a keyboard 18 on display 14 indicates an operating mode for inputs monitored at one part of display 14 and a fold state that raises the content portion of display 14 for viewing by an end user. Various examples of housing rotational orientations and display content presentations are set forth herein.

Figure 2:
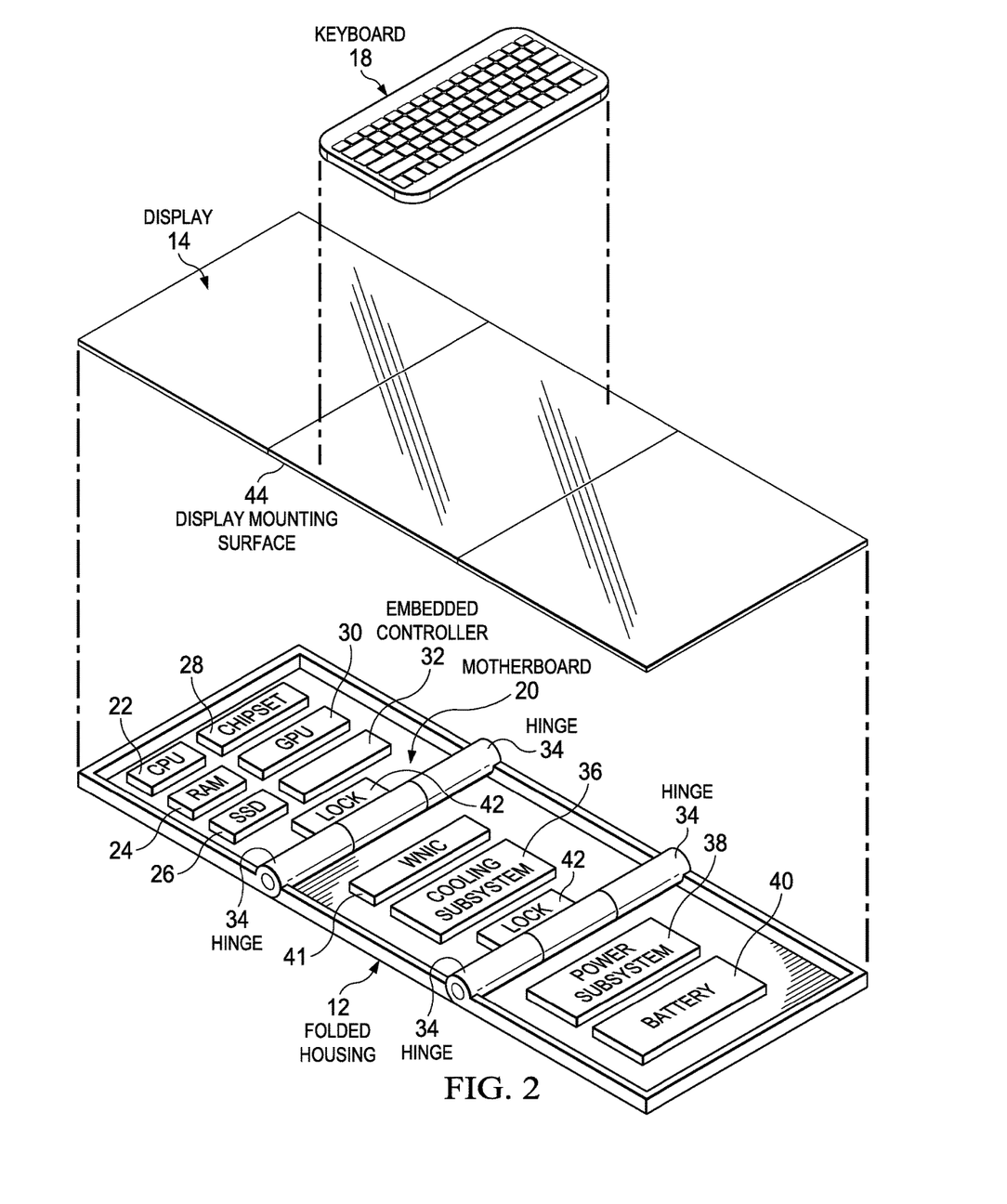
FIG. 2 depicts an upper perspective blown-up view of a portable information handling system having a foldable display configured in a planar tablet configuration.

Referring now to FIG. 2, an upper perspective blown-up view depicts a portable information handling system 10 having a foldable display 14 configured in a planar tablet configuration. The terms planar and tablet refer to a configuration having display 14 unfolded with each housing 12 portion disposed in a common plane. In the example embodiment, housing 12 has three portions rotationally-coupled to each other by hinges 34 so that each housing 12 portion rotates independently relative other portions. In alternative embodiments, a variety of types of hinges 34 may be used, such as to synchronize movement of some or all housing portions. Further, the end portions of housing 12 may rotationally couple to the middle portion to support up to a full 360 degrees of rotation relative to the middle portion. For example, in one embodiment, the three portions of housing 12 fold to a collapsed state for storage with a minimized footprint, such as with all three portions vertically stacked on each other.

In the example embodiment, portable information handling system 10 includes a variety of processing components disposed in housing 12 that cooperate to process information. For example, a central processing unit (CPU) 22 executes instructions stored in random access memory (RAM) 24 to process information. A solid state drive (SSD) 26 provides persistent storage to store information and applications when in a powered down state. A chipset 28 includes a variety of processors and controllers that perform physical interface and other functions, such as data communication and memory control. A graphics processor unit (GPU) 30 processes information for presentation at display 14, such as by generating pixel values from visual information and providing the pixel values to display 14 so that display 14 presents visual images corresponding to visual information that defined the pixel values. An embedded controller 32 manages interfaces with input/output devices and other physical functions, such as power control. For example, inputs from an end user may include physical touches at display 14 detected by a capacitive touchscreen or from external peripherals, such as keyboard 18, that communicate with wireless signals to a wireless network interface card (WNIC) 41. Thermal energy generated by the processing components is managed within housing 12 by a cooling subsystem 36, such an active cooling fan that moves air within housing 12 or a passive thermal sink and transfer system. Power is provided from an integrated battery 40 and a power subsystem 38 that accepts external power to run the processing components and charge battery 40.

Display 14 is, for example, an OLED film providing a contiguous display area across the upper surface of housing 12 and mounted over a display mounting surface 44. GPU 30 interfaces with display 14 to communicate pixel values that display 14 applies to present visual images. Display mounting surface 44 provides support to display 14, such as in response to touches made by an end user as inputs. Display mounting surface 44 maintains display 14 over each housing 12 portion and provides movement for folding display 14 where hinges 34 provide rotational coupling of housing 12 portions. A lock 42 interfaced with hinges 34 support selective rotational movement of housing 12 portions, such as by adjusting the amount of friction applied against rotational movement of hinges 34. In the example embodiment, each portion of housing 12 has similar dimensions, however, in alternative embodiments, the size of each portion may be different. For example, in the example embodiment keyboard 18 rests on display 14 in a central location; however in alternative embodiments, portions of housing 12 that support keyboard 18 may have a dimension sized more closely to that of keyboard 18.

Figure 3:
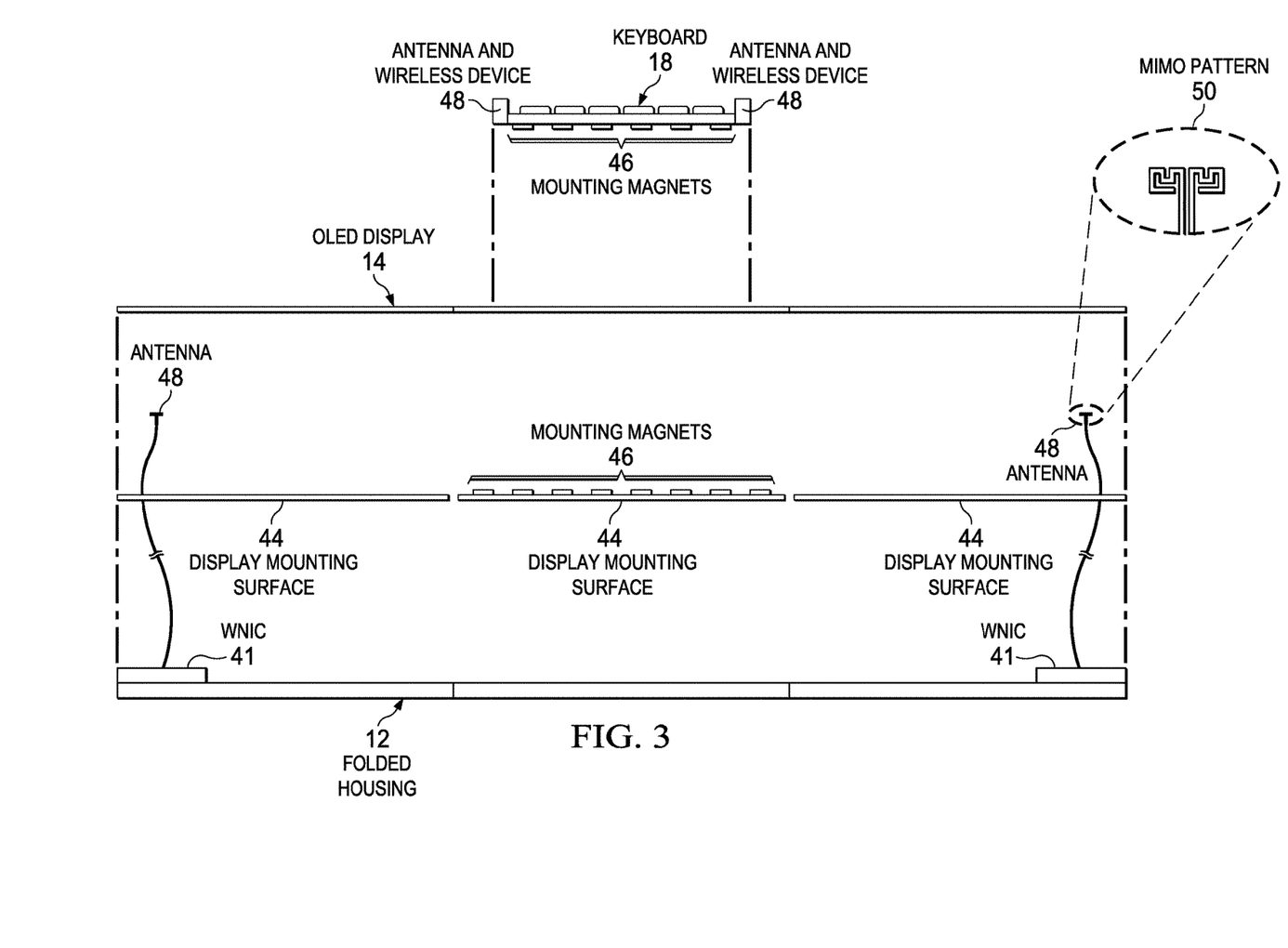
FIG. 3 depicts a side blown up view of a portable information handling system having a foldable display and peripheral keyboard removably mounted with magnetic attraction.

Referring now to FIG. 3, a side blown up view depicts a portable information handling system 10 having a foldable display 14 and peripheral keyboard 18 removably mounted with magnetic attraction. Mounting magnets 46 rest on display mounting surface 44 and keyboard 18 to bias keyboard 18 into a desired location on display 14. In the example embodiment, opposing magnet polarities are used to bias keyboard 18 into position; however, in alternative embodiments other types of biasing mechanisms may be used, such as physical formations formed in display 14 and keyboard 18 that interact or interconnect to maintain keyboard 18 in a desired position. Although opposing magnet polarities provide improved magnetic attraction, magnets may be used in just one of display 14 and keyboard 18 by using ferromagnetic material as the opposing attractive material. Placement of keyboard 18 on display 14 is detected at information handling system 10 so that presentation of visual images under keyboard 18 is stopped and other configuration actions may take place, such as presenting virtual input devices at display 14 and modifying presentation of content at display 14 so an end user views visual information while inputs are made at keyboard 18. Detection of keyboard 18 on display 14 may be performed by analyzing touch points detected by a touchscreen over display 14, by detecting proximity of magnets with a Hall sensor, and/or similar techniques.

Keyboard 18 integrates an antenna and wireless device 48 that supports wireless communication between keyboard 18 and information handling system 10. For example, opposing MIMO pattern antenna 50 communicate with 60 GHz wireless signals to provide high data rate transfers with a low power signal. In one embodiment, antenna and wireless device 48 in keyboard 18 includes tri-band wireless signal support for interacting with external wireless devices, such as WiFi wireless access points. Integrating the WiFi antenna in keyboard 18 provides space to have an efficient antenna structure that enhances signal strength for improved data transfer rates and range. A 60 GHz interface between keyboard 18 and information handling system 10 relays WiFi communications when keyboard 18 is detected on display 14.

Figure 4A:
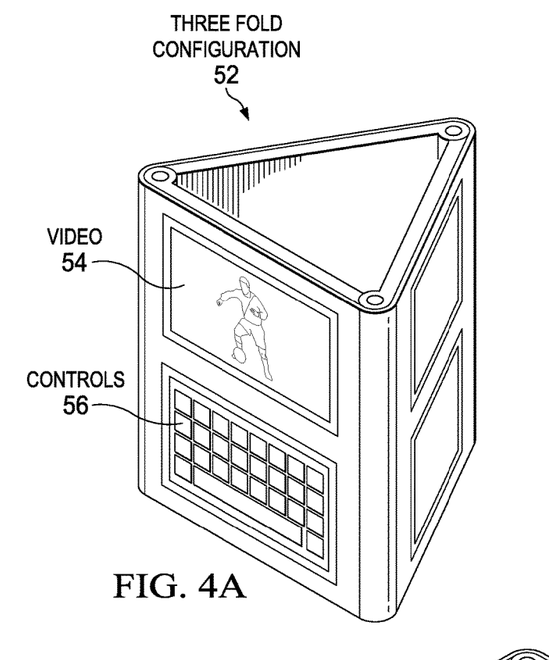
FIGS. 4A, 4B and 4C respectively depict the portable information handling system configured with a three-fold, four-fold and clamshell configuration.
Figure 4B:
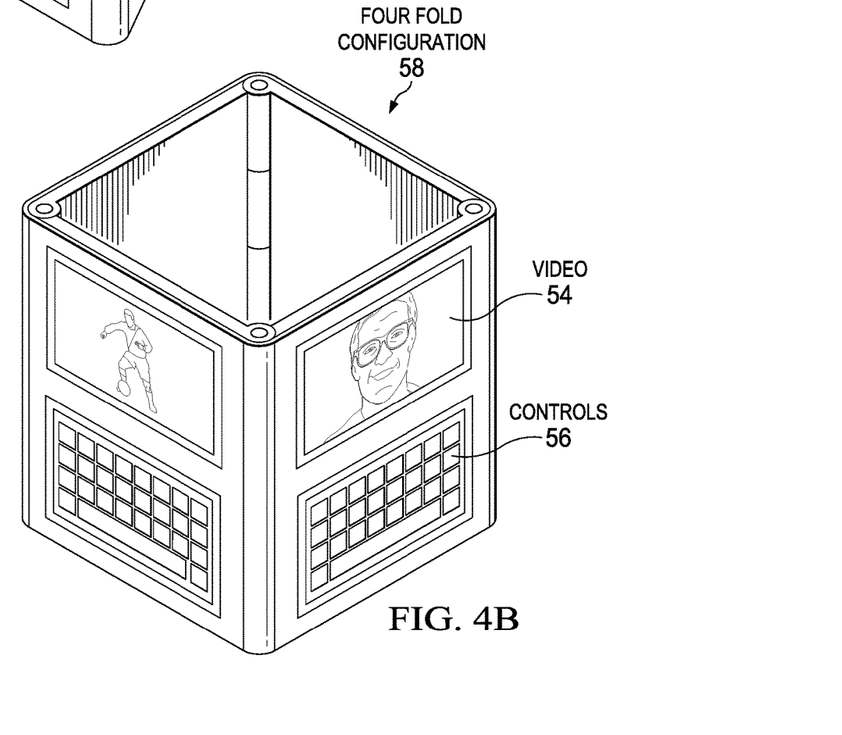
Figures 4C, 5:
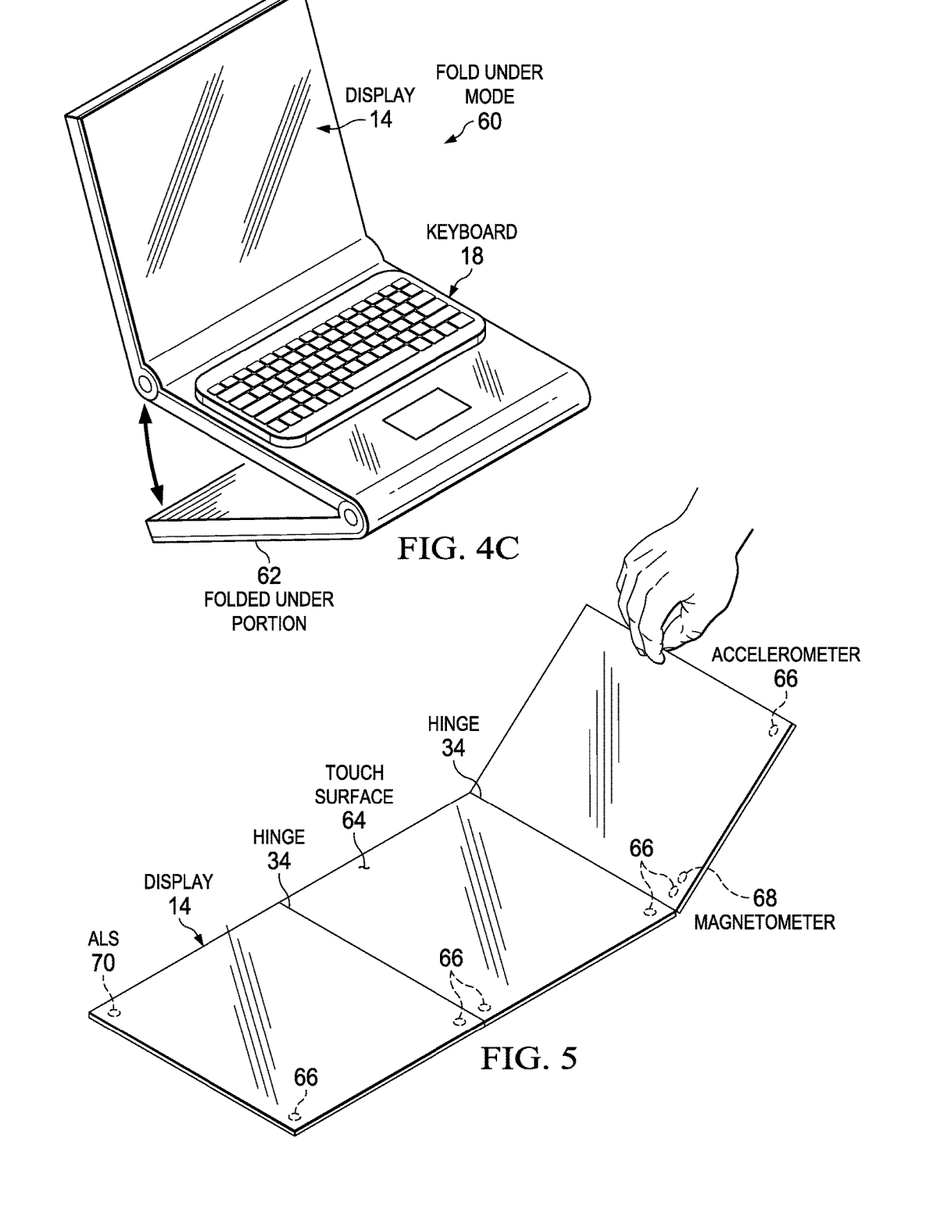
FIG. 5 depicts a portable information handling system having a folded display with an end user input to rotate the housing portions to a desired configuration.

Referring now to FIGS. 4A, 4B and 4C respectively, portable information handling system 10 is configured with a three-fold, four-fold and clamshell configuration. In the example embodiment of FIG. 4A, housing 12 has three rotationally-coupled portions rotated to a three-fold configuration that forms a support to hold information handling system 10 upright in a portrait orientation. The three fold configuration provides three viewing areas that may each present content independently. In the example, a video window 54 is presented at the top of each housing portion with control window 56 below that accepts control inputs for video window 54. In the example embodiment, multiple users may view the same content from multiple angles by outputting the same content in each video window 54 of each housing 12 portion. Alternatively, each display face may present independent content as desired by the user. FIG. 4B illustrates a housing 12 having four folded portions that present content at four independent faces of display 14. One example use case for such a configuration is a video conference in an enterprise environment that allows multiple end users arranged around a conference table to participate in a video call. Alternatively, one or more portions of display 14 may present supporting information, such as documents being discussed in the video conference. In one embodiment, placing information handling system 10 in the three or four fold configuration and the portrait orientation as depicted by FIGS. 4A and 4B results in automated selection of a video conference application and presentation of video conference controls. In alternative embodiments, alternative applications may be presented at display 14 based upon detected housing portion configurations and orientation, such as multimedia windows or other applications.

Generally, the relative rotational orientation of housing portions provides clues relating to an end user's intended use of information handling system 10 so that rotation of housing portions to a particular orientation may initiate related configuration of visual image and application presentations. In the example embodiment of FIG. 4C, a three-fold housing configuration has a folded configuration that mimics a clamshell portable information handling system. A folded under portion 62 forms a solid base to support display 14 in a vertical orientation above keyboard 18. An end user has access to keyboard 18 to make keyed inputs while observing content on display 14. Proximate to keyboard 18 on the horizontally-disposed display 14, additional input or control interfaces may be presented that enhance interactions with keyboard 18. For example, a mouse or touchpad area may be presented as a virtual device, or specific display control inputs may be presented, such as to control color, brightness, contrast, etc. . . . As is described herein, various display presentation configurations are automatically enforced by detecting the context of the information handling system, such as the relative rotational orientation of housing portions.

Referring now to FIG. 5, a portable information handling system 10 is depicted having a folded display 14 with an end user input to rotate the housing 12 portions to a desired configuration. The end user hand has grasped one housing 12 portion and lifted that housing portion to change the housing configuration from a planar tablet configuration to a folded configuration, such as a clamshell configuration. A plurality of sensors disposed in information handling system 10 detect end user inputs associated with changes to the configuration of housing 12 so that the end user's desired configuration may be predicted as an aid to achieving the desired configuration. For example, sensors that provide feedback of an end user's desired configuration include accelerometers 66, magnetometers or hall switches 68, ambient light sensors 70, capacitive touch surface 64 of display 14 and other similar sensors. Logic in information handling system 10 analyzes sensed conditions and system context to predict a configuration desired by the end user touches. For example, other context used to predict a desired end user housing configuration may include the applications running on information handling system 10, the content presented at display 14, the proximity of a keyboard 18 to display 14, the system location and previous end user configurations selected under similar conditions.

In the example embodiment depicted by FIG. 5, an end user grasp has multiple fingers detected at touch surface 64 and a thumb detected on the backside of housing 12 at only one portion of housing 12. The end user grasp indicates a desire to rotate just the grasped housing 12 portion about hinge 34. For example, logic in information handling system 10 detects a touch at only one housing portion and, in response, releases friction at hinge 34 for that one housing portion to rotate more freely. Once accelerometer 66 detects that motion of that housing portion has ceased, information handling system 10 stiffens friction at hinge 32 to hold the housing portion in the selected rotational orientation. This provides the end user with a one-handed operation to change the housing orientation at one portion while retaining the other two portions in an existing orientation. If, as another example, the end user grasps both outer portions of housing 12 at the same time, relaxation of friction at all hinges 34 provides ready translation of information handling system 10 from a planar housing configuration to a clamshell or other type of folded configuration. Over time, logic in information handling system 10 learns an association between end user touches and desired housing configurations and manipulates friction at hinges 34 to aid the end user in achieving a desired rotational orientation of the housing portions.

Figure 6:
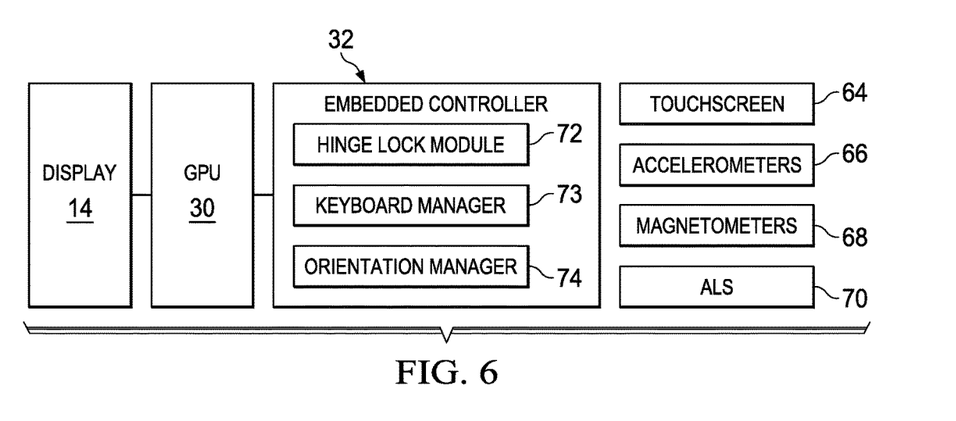
FIG. 6 depicts a block diagram of a portable information handling system having foldable display with automated configuration and display management.

Referring now to FIG. 6, a block diagram depicts a portable information handling system 10 having a foldable display 14 with automated configuration and display management. Information handling system housings that have three or more rotationally coupled housing portions provide end users with increased flexibility to view content and interact with the content by arranging the housing portions in different relative rotational orientations. In some instances, the end user may want to pick up information handling system 10 in a tablet configuration without having hinges move. When an end user does rotate housing portions relative to each other, the end user will typically want content viewed on display 14 to adapt to the new housing portion orientation. In order to provide automated housing orientation and display content adjustment, logic in information handling system 10 monitors sensors and context to automate selection of housing orientation and display content. For example, embedded controller 32 or similar processing resources of information handling system 10 executes embedded code that controls hinge friction, such as by adjusting lock 42, and content presentation areas of display 14. A hinge lock module 71 interfaces with locks 42 to selectively adjust friction applied by locks 42 between rotationally-coupled housing portions. As sensors detect end user touches that indicate a desired housing portion relative rotational orientation, hinge lock module 72 selectively releases and reasserts friction at one or more locks 42 to aid rotational movement of housing portions to a predicted position of what the end user desires for the relative rotational configuration. Hinge lock module 72 predicts the end user's desired location based upon sensed inputs and other contextual information about the operational state of information handling system 10.

One example of a predicted desired end user housing configuration is provided by detection of finger and thumb positions at a housing portion. For instance, detection of finger touches on a backside of a housing portion with a thumb touch on a front side of the housing portion indicates a desire by the end user to rotate the housing portion from back towards front. A palm resting on a middle portion of housing 12 while fingers grasp an outer portion indicates a desired to keep the middle portion from moving rotating relative to other housing portions that are not touched. Hand grasps on both outer portions of housing 12 indicates a desire to collapse the outer housing portions into the middle housing portion. As housing portions rotate, accelerometer 66 inputs detect housing portion orientation relative to gravity and, thus, relative to other housing portions so that monitoring of the movement of the housing portions allows readjustment of hinge friction as the predicted desired housing orientation is reached. Similarly, ambient light sensor 70 and magnetometer 68 sense proximity of housing portions to each other to provide information of relative housing portion orientation. For example, a low sensed ambient light or a rapid change in ambient light indicates that housing portion proximity has impacted light accessing ambient light sensor 70. As another example, interaction by a magnetometer or Hall switch with a magnet indicates that another housing portion has gained proximity. In addition, pressure sensed against locks 42 indicates how much force an end user is applying against the housing portions to cause movement. Feedback from locks 42 to hinge lock module 72 allows adjustment to lock friction so that as an end user reduces force the housing portions are maintained in a desired position. As an example, hinge lock module 72 controls a solenoid in lock 42 that selectively increases or decreases friction operating against hinges 34.

A keyboard manager 73 executing as embedded code on embedded controller 32 detects proximity of a keyboard 18 to display 14 to provide additional information regarding an end user's desired rotational orientation. For example, magnets disposed in keyboard 18 are detected by a magnetometer or Hall switch as keyboard 18 is placed into position on display 14. Detection of a keyboard indicates a desire of the end user to rotate the housing portions into either a clamshell orientation for typing or a closed configuration around keyboard 18. Similarly, removal of keyboard 18 from display 14 indicates a desire by the end user to configure the housing portions to a tablet configuration.

An orientation manager 74 interfaces with hinge lock module 72 and keyboard manager 73 to automatically adjust content presented at display 14 as housing portion rotational orientation changes. For example, if keyboard manager 73 detects placement of a keyboard 18 on display 14, orientation manager 74 adjusts content presentation at display 14 to an area of display 14 visible and aligned for accepting keyed inputs. Further, orientation manager 74 removes presentation of content under keyboard 18 and presents a virtual touchpad proximate keyboard 18 for accepting end user touch inputs. Advantageously, orientation manager 74 detects the orientation of the keyboard in order to predict which portion of display 14 an end user will view while making keyed inputs. When keyboard manager 73 detects removal of a keyboard 18, orientation manager 74 provides presentation of content at display 14 in place of keyboard 18, such as by presenting visual information in a tablet mode across the entire surface of display 14.

As another example, orientation manager 73 adapts information presentation at display 14 based upon sensed housing portion orientation. In a planar tablet configuration, the entire display surface presents content. If rotational orientation indicates a clamshell or other folded orientation of housing portions, content is presented at the display covering the housing portion facing the end user. In such a configuration, a vertical orientation at a housing portion indicates that an end user intends to view content and a horizontal orientation indicates that an end user intends to perform touch inputs. Thus, for example, upon detecting a clamshell orientation, orientation manger 74 presents content at the vertically-oriented portion of display 14 and presents a virtual keyboard on the horizontally-oriented portion of display 14. As another example, orientation manager 74 detects the three-fold and four-fold configurations depicted in FIGS. 4A and 4B by monitoring orientation provided from accelerometers 66 and housing portion proximity from magnetometers 68, such as when magnets on opposing ends of housing 12 come into proximity with each other. In response, orientation manager 74 automatically provisions content on each face of display 14 for multi-user multi-axis viewing. For example, a videoconference and related controls may automatically be initiated, or a multimedia content may be repeated at each display face. In various embodiments, different faces of display 14 may take on different presentation roles, such as by showing a videoconference on one or more faces and shared documents on another face.

Figure 7:
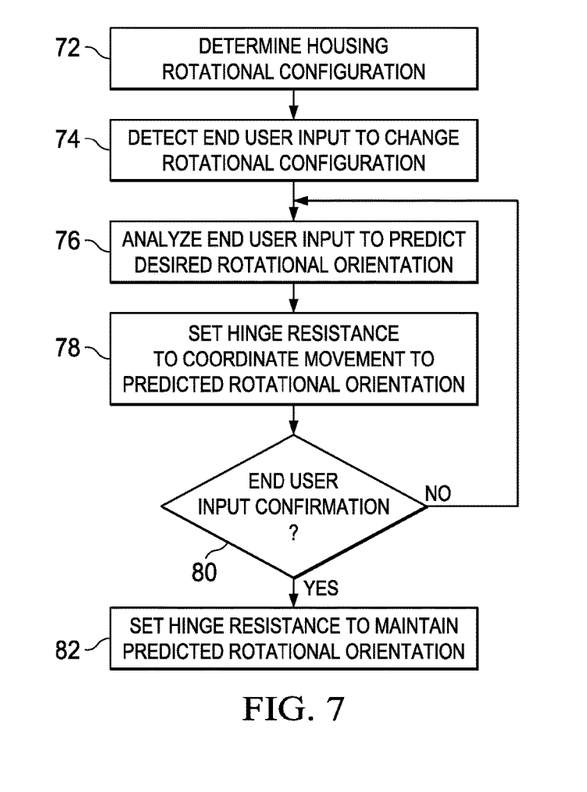
FIG. 7 depicts a flow diagram of a process for configuring a foldable portable information handling system to a predicted desired rotational orientation.

Referring now to FIG. 7, a flow diagram depicts a process for configuring a foldable portable information handling system to a predicted desired rotational orientation. The process starts at step 72 by determining a housing rotational configuration. Initial configuration is analyzed from sensed conditions, such as accelerometer readings at each housing portion, proximity determinations from magnet and magnetometer readings and hinge positions from hinge lock module 72. At step 74 an end user input is detected that is associated with a change in housing portion rotational configuration. The end user inputs include touches at the front or rear of a housing portion, visual images of an end user reaching for the information handling system, accelerations or other indicia. In some instances, an end user interaction with applications running on the information handling system may indicate a pending change to rotational configuration orientation, such as a selection of an application that is not compatible with the existing configuration. For example, selection of a videoconference application while configured in a tablet mode indicates a likely end user interaction to re-configure the housing. As another example, placement on or removal of a keyboard from display 14 indicates an end user intent to change orientation based on the availability of the user interface device.

At step 76, an analysis of end user inputs is performed to predict a housing portion rotational orientation desired by the end user. The analysis compares the existing rotational configuration with the sensed inputs to determine expected inputs of the end user for achieving a desired rotational configuration. For example, placement of the keyboard on a middle housing portion in a tablet configuration with the keys aligned in a direction indicates a likely intent to raise the housing portion in that direction to a viewing position. Similarly, removal of the keyboard from a clamshell configuration with housing portion raised in a viewing position indicates an intention to transition to a tablet rotational configuration. Other indicia of the desired rotational configuration include end user touches on the front or rear surface of a housing portion, accelerations and housing portion proximity to each other. In addition, end user application selection or application in focus provides information about an end user's intentions in subsequent interactions, including a likely end user desired orientation. Over time, tracking an end user's actual selected rotational orientation for a given set of inputs allows the information handling system learn end user preferences so that predicted rotational orientations are more accurate.

At step 78, hinge resistance to movement is adjusted to coordinate movement of the housing portions relative to each other so that the housing portions tend to rotate in the manner anticipated as desired by the end user. For example, if transition from a tablet mode to a clamshell mode is predicted, the hinge between the rotating housing elements has friction relaxed while the hinge between other housing portions remains stiff. In a four-fold housing configuration, the middle hinge may relax friction while intermediate hinges remain stiff so that the housing folds roughly in half. As another example, if a videoconference configuration is predicted that will form a triangle or cube out of the housing portions, all hinges may have resistance relaxed to aid rapid transition to the desired rotational configuration. At step 80, a comparison is made of actual end user inputs to predicted inputs to confirm that the end user intends to configure the housing portions as predicted. For example, if hinge pressure and movement is consistent with a predicted movement, the process continues to step 82 to set hinge resistance to maintain the predicted rotational orientation. If, on the other hand, end user inputs counter the predicted movement, the process returns to step 76 to re-analyze the end user's intentions. In that regard, although hinge resistance is set to accommodate a predicted movement, end user pressure that counters the predicted movement will overcome the friction so that the end user can achieve a desired rotational configuration.

Figure 8:
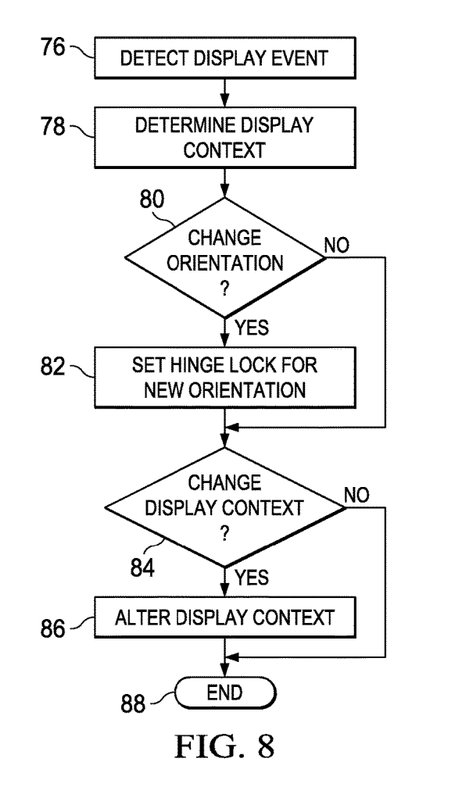
FIG. 8 depicts a flow diagram of a process for configuring a foldable portable information handling system to adapt displayed content to a rotational orientation.

Referring now to FIG. 8, a flow diagram depicts a process for configuring a foldable portable information handling system to adapt displayed content to a rotational orientation. As an end user changes rotational configuration of housing portions, the end user will generally want a different view of the display content with the new orientation. The process starts at step 76 with detection of a display event, such as a change in orientation of a housing portion, a change in orientation of the housing as a whole, a change in content presented at the display, a change in content at a display portion associated with a housing portion, placement or removal of a keyboard at the display, etc. In response to detection of a display event, the process continues to step 78 to determine a display context. The display context is determined from a totality of conditions sensed proximate to the display, including the content presented at the display. Generally, analysis of the display context is intended to predict how an end user would desire to view display content in light of the display event. In this regard, multiple factors are considered, such as the application in focus at the display, the orientation of the display, historical end user selections responsive to the display event, input and output devices available, network interface available, etc. At step 80, a determination is made of whether the display event included a change in orientation of the housing or a housing portion. If so, at step 82 the hinge locks are adjusted to coordinate the new orientation. At step 84, a determination is made of whether to change the display context based upon the detected display event. Changes to display context include the display area used to present primary content and/or secondary content, changes to applications presenting content, changes to applications in focus and changes to virtual input devices. As an example, in a tablet configuration a primary content is presented across the entire display and at reconfiguration to a clamshell configuration, the primary content is presented at a portion of the display corresponding to one housing portion while a virtual keyboard is presented at another portion of the display corresponding to another housing portion. As another example of a change in context, the virtual keyboard is removed when a peripheral keyboard is placed on the virtual keyboard and a virtual touchpad is presented proximate the peripheral keyboard. As another example, rotation of a three-fold or four-fold housing configuration between landscape and portrait orientations initiates or removes a videoconference user interface. In one embodiment, a video conference window is presented at the display area corresponding to a housing portion and video conference controls are presented at a display area corresponding to a different housing portion. Alternatively, automated presentation of a video conference may include a videoconference viewing window and control window on each housing portion display. At step 86, the display content is altered if appropriate and the process ends at step 88.

Figure 9:
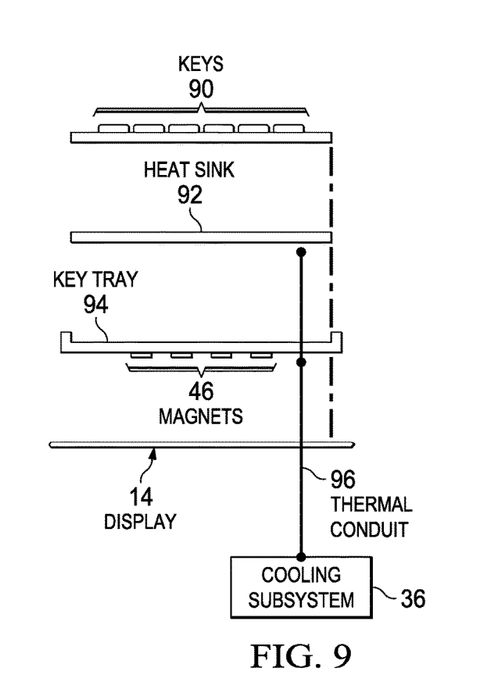
FIG. 9 depicts a side blown up view of a portable information handling system having thermal transfer to a peripheral keyboard.

Referring now to FIG. 9, a side blown up view depicts a portable information handling system 10 having thermal transfer to a peripheral keyboard 18. Keyboard 18 has a heat sink 92 integrated below keys 90, such as an aluminum block that readily conducts and accepts thermal energy. Keys 90 and heat sink 92 integrate into a key tray 94, such as a tray constructed with an insulating plastic, which includes magnets 46. A thermal conduit 96 thermally interfaces heat sink 92 and cooling subsystem 36 so that thermal energy is transferred from cooling subsystem 36 to heat sink 92 when keyboard 18 is placed on display 14. For example, magnets 46 bias keyboard 18 into a predetermined position on display 14 that aligns thermal conduit 96 so that a thermal interface is established between heat sink 92 and cooling subsystem 36. In one example embodiment, a protrusion extending from keyboard 18 extends into an indentation defined in display 14 at which the thermal interface occurs. The magnetic or other biasing mechanism that aligns keyboard 18 on display 14 also aligns antenna elements to maximize wireless transfer data rates between keyboard 18 and information handling system 10. In alternative embodiments, keyboard 18 may include a variety of additional supporting functions in addition to heat sink 92. For example, keyboard 18 may include additional storage, such as a solid state drive, and additional networking resources, such as a wireless wide area network (WWAN) card to support cell service data transfers. The additional supporting functions included in keyboard 18 wirelessly interface with information handling system 10 upon detection of keyboard 18, such as with a 60 GHz interface. In one example embodiment, detection of keyboard 18 automatically reconfigures information handling system 10 to leverage the additional functions, such as by allowing a greater internal thermal condition when keyboard 18 is detected in a position associated with thermal conductivity of internal thermal energy to the external heat sink. As another example, keyboard 18 may include a wireless charging device that wireless transfers power to wireless power receiving device disposed in housing 12. For example, keyboard 18 includes a cable interface to an external power source that provides power to a wireless charging device integrated in keyboard 18. Upon detection of keyboard 18 on display 14 in an appropriate position, wireless power transfer is initiated from keyboard 18 to a battery in housing 12. In various embodiments, various positions on display 14 support different functions so that placement of the keyboard in a particular position defines the function performed.

Although the present invention has been described in detail, it should be understood that various changes, substitutions and alterations can be made hereto without departing from the spirit and scope of the invention as defined by the appended claims.

What is claimed is:

1. A portable information handling system comprising:
a planar housing having at least three rotationally coupled portions;
a processor disposed in the planar housing and operable to execute instructions to generate visual information;
a memory disposed in the planar housing and interfaced with the processor, the memory operable to store the information;
a display disposed in the planar housing over the at least three rotationally coupled portions and interfaced with the processor and the memory, the display operable to present the information as visual images, the display comprising a flexible film that folds responsive to rotation of the at least three rotationally coupled portions;
a graphics processor interfaced with the display and operable to process the visual information to generate pixel information, the pixel information defining the visual images for presentation on the display;
one or more sensors interfaced with the planar housing and operable to detect a relative position of the at least three rotationally coupled portions to each other; and
a user interface orientation module interfaced with the one or more sensors and the graphics processor, the user interface orientation module operable to apply the relative position of the at least three rotationally coupled portions to adapt the visual images presented at each of the at least three rotationally coupled portions, the visual images including a first content displayed at all of the at least three rotationally coupled portions in a planar landscape orientation, the first content and a second content displayed at first and second of the at least three rotationally coupled portions in a folded landscape orientation, and the first content and the second content presented at each of the at least three rotationally coupled portions in a folded portrait orientation.

2. The portable information handling system of claim 1 wherein the second content comprises a virtual keyboard to accept end user inputs touched at the display.

3. The portable information handling system of claim 2 wherein the second content further comprises a virtual touchpad to accept the end user inputs touched at the display.

4. The portable information handling system of claim 1 wherein the folded portrait orientation comprises a perpendicular orientation having four rotationally coupled portions in a cube configuration, the first content comprises a video conference and the second content comprises a control panel for the video conference.

5. The portable information handling system of claim 1 wherein the folded portrait orientation comprises a perpendicular orientation having three rotationally coupled portions in a triangle configuration, the first content having a video conference with a different participant presented at each rotationally coupled portion.

6. The portable information handling system of claim 1 wherein the folded portrait orientation comprises a perpendicular orientation, the first content having a video conference with a first participant and the second content comprises a shared document.

7. The portable information handling system of claim 1 wherein the one or more sensors comprise at least one magnetometer disposed to detect opposing ends of the housing in proximity to each other.

8. The portable information handling system of claim 1 wherein the one or more sensors are associated with one or more hinges that couple the at least three rotationally coupled portions to each other.

9. A method for presenting visual information at a portable information handling system, the method comprising:
presenting a first content at a display of the portable information handling system, the portable information handling system having at least three rotationally-coupled housing portions in a planar landscape orientation, each of the at least three rotationally coupled housing portions having a viewing area;
detecting rotation of the at least three rotationally-coupled housing portions of the portable information handling system relative to each other from the planar landscape orientation to a folded portrait orientation; and
in response to the detecting, presenting the first content at each of the viewing areas of each of the at least three rotationally-coupled housing portions and presenting a second content at each of the viewing areas of each of the at least three rotationally-coupled housing portions, the second content including a user interface to control the first content.

10. The method of claim 9 wherein:
the first content comprises an application output; and
the second content comprises a virtual input device.

11. The method of claim 10 wherein the virtual input device comprises a keyboard.

12. The method of claim 11 wherein the virtual input device further comprises a touchpad.

13. The method of claim 9 further comprising:
presenting a videoconference as the first content on an upper portion of each of the viewing areas, and presenting a videoconference control panel as the second content on a lower portion of each of the viewing areas.

14. The method of claim 9 wherein the detecting rotation further comprises detecting a proximity of opposing ends of the at least three rotationally coupled housing portions to each other.

15. A portable information handling system display comprising:
an OLED film disposed over a housing, the housing having at least four portions that rotate relative to each other, the OLED film flexing during rotation of the housing portions to conform to the housing;
one or more sensors operable to detect a relative rotational position of the at least four housing portions to each other; and
a user interface orientation module interfaced with the one or more sensors and operable to apply the relative rotational position to adapt visual images presented at the OLED film, the visual images including a first content displayed at all housing portions in a first relative orientation and a second content displayed at first and second of the at least four housing portions in a second relative orientation;

wherein the user interface orientation module is further operable to detect a cube configuration of the housing at least four portions and, in response, to present a videoconference window on each of the housing at least four portions.

16. The portable information handling system display of claim 15 wherein the second content comprises a virtual keyboard presented at the second of the at least four housing portions and operable to accept key inputs.

17. The portable information handling system display of claim 15 wherein:

the one or more sensors are further operable to detect landscape and portrait orientations; and in response to detection of both a folded orientation of the at least four housing portions and the portrait orientation, the user interface orientation module presents multimedia content at the first of the at least four housing portions and a control panel at the second of the at least four housing portions.

18. The portable information handling system display of claim 17 wherein the multimedia content comprises the videoconference.

19. The portable information handling system of claim 15 wherein the user interface orientation module is further operable to present the videoconference control panel on each of the four housing portions.

\* \* \* \* \*